(12) United States Patent
Wang et al.

(10) Patent No.: US 11,524,796 B2
(45) Date of Patent: *Dec. 13, 2022

(54) POSITIONING MECHANISM, UAV DOCK USING SAME, AND UAV REPLENISHMENT METHOD

(71) Applicant: SZ DJI TECHNOLOGY CO., LTD., Shenzhen (CN)

(72) Inventors: Mingxi Wang, Shenzhen (CN); Hanping Chen, Shenzhen (CN); Xiangyu Chen, Shenzhen (CN); Yuan Lin, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 615 days.

This patent is subject to a terminal disclaimer.

(21) Appl. No.: 16/549,763

(22) Filed: Aug. 23, 2019

(65) Prior Publication Data
US 2020/0010215 A1    Jan. 9, 2020

Related U.S. Application Data

(63) Continuation of application No. 15/599,204, filed on May 18, 2017, now Pat. No. 10,414,517, which is a
(Continued)

(51) Int. Cl.
*B64F 1/02* (2006.01)
*B64C 39/02* (2006.01)

(52) U.S. Cl.
CPC .............. *B64F 1/02* (2013.01); *B64C 39/024* (2013.01); *B64C 2201/182* (2013.01)

(58) Field of Classification Search
CPC ..... B64F 1/02; B64C 39/024; B64C 2201/18; B64C 2201/182
(Continued)

(56) References Cited

U.S. PATENT DOCUMENTS 4,255,911 A * 3/1981 Beacom .................... E04H 6/44
52/174
4,834,321 A    5/1989 Granger
(Continued)

FOREIGN PATENT DOCUMENTS

CA    2759691 A1    12/2010
CN    102156480 A    8/2011
(Continued)

OTHER PUBLICATIONS

The World Intellectual Property Organization (WIPO) International Search Report for PCT/CN2014/091587 dated Aug. 19, 2015 5 Pages.
(Continued)

*Primary Examiner* — Christopher P Ellis
(74) *Attorney, Agent, or Firm* — Anova Law Group, PLLC

(57) ABSTRACT

A positioning mechanism includes a base including a landing area and a guide member movably arranged at the landing area and configured to guide a moving object. The landing area includes a positioning portion. The guide member is configured to be in a non-operating state or an operating state relative to the base. A form of the guide member in the non-operating state is different from the form of the guide member in the operating state.

19 Claims, 12 Drawing Sheets

Related U.S. Application Data continuation of application No. PCT/CN2014/091587, filed on Nov. 19, 2014.

(58) Field of Classification Search
USPC .................................................. 244/114 R
See application file for complete search history.

(56) References Cited

U.S. PATENT DOCUMENTS

| | | |
|---|---|---|
| 8,297,552 B2 | 10/2012 | Ying |
| 9,187,186 B2 | 11/2015 | Besenzoni |
| 2014/0124621 A1 | 5/2014 | Godzdanker et al. |
| 2014/0129059 A1 | 5/2014 | Scarlatti et al. |
| 2014/0236390 A1 | 8/2014 | Mohamadi |
| 2014/0319272 A1 | 10/2014 | Casado et al. |
| 2016/0016675 A1 | 1/2016 | Zwaan et al. |
| 2016/0039541 A1 | 2/2016 | Beardsley et al. |
| 2016/0257426 A1 | 9/2016 | Mozer |
| 2016/0311329 A1 | 10/2016 | Rodriguez |
| 2016/0376031 A1 | 12/2016 | Michalski et al. |
| 2017/0253349 A1 | 9/2017 | Wang et al. |
| 2018/0009549 A1 | 1/2018 | Sullivan et al. |
| 2018/0093768 A1 | 4/2018 | Castleman |
| 2018/0099764 A1 | 4/2018 | Schill et al. |
| 2018/0137767 A1 | 5/2018 | Hou et al. |
| 2018/0148170 A1 | 5/2018 | Stamatovski |
| 2019/0039752 A1 | 2/2019 | Venturelli et al. |
| 2019/0061940 A1 | 2/2019 | Tai et al. |

FOREIGN PATENT DOCUMENTS

| | | |
|---|---|---|
| CN | 202922160 U | 5/2013 |
| CN | 103645740 A | 3/2014 |
| CN | 103754288 A | 4/2014 |
| CN | 103809598 A | 5/2014 |
| CN | 103955227 A | 7/2014 |
| CN | 104002981 A | 8/2014 |
| CN | 104007766 A | 8/2014 |
| CN | 104058100 A | 9/2014 |
| CN | 104085538 A | 10/2014 |
| CN | 203854854 U | 10/2014 |
| CN | 204250382 U | 4/2015 |
| DE | 19518454 A1 | 11/1996 |
| DE | 19950674 A1 | 4/2001 |
| DE | 102013004881 A1 | 9/2014 |
| EP | 2799336 A1 | 11/2014 |
| JP | H07172397 A | 7/1995 |
| JP | 2012232654 A | 11/2012 |
| JP | 2013203394 A | 10/2013 |
| JP | 2015042539 A | 3/2015 |
| KR | 1020130005503 A | 1/2013 |
| KR | 1020140115024 A | 9/2014 |
| WO | 2007086055 A1 | 8/2007 |
| WO | 2014177661 A1 | 11/2014 |
| WO | 2015108588 A2 | 7/2015 |
| WO | 2015117216 A1 | 8/2015 |
| WO | 2015196127 A1 | 12/2015 |
| WO | 2016015301 A1 | 2/2016 |

OTHER PUBLICATIONS

Lu, Qian & Qi, Guo-Qing, The Position System of UAV, The Second Chinese Command and Control Conference Proceedings, 2014. pp. 122-125.

* cited by examiner

POSITIONING MECHANISM, UAV DOCK USING SAME, AND UAV REPLENISHMENT METHOD

CROSS-REFERENCE TO RELATED APPLICATIONS

This application is a continuation of application Ser. No. 15/599,204, filed on May 18, 2017, which is a continuation application of International Application No. PCT/CN2014/091587, filed on Nov. 19, 2014, the entire contents of both of which are incorporated herein by reference.

TECHNICAL FIELD

The present disclosure relates to a dock, particularly to a positioning mechanism and a small Unmanned Aerial Vehicle (UAV) dock using the positioning mechanism, and a UAV replenishment method.

BACKGROUND

The automatic pinpoint landing and positioning technique of a UAV consists in pinpoint landing of a UAV using techniques such as machine vision in the scenario of an unmanned operation, and fixing the position of the UAV to a desired accurate position after landing. This technique can be used in many applications. For example, after the UAV lands, coordinated ground equipment performs interaction with it as desired, e.g., automatic battery replacement, or automatic load replacement.

Generally, common positioning solutions include a totally active mode, i.e. after a UAV lands on the ground, moving it to the desired position using an actuator, such as a motor, and fixing the three dimensions thereof in the plane (two linear dimensions, and one angle).

A totally passive mode is also possible, e.g. the solution of Skycatch company: the bottom of the UAV is made in a large conical shape, the landing positioning portion is made as a large conical pit, and after landing, the UAV automatically slides into the landing positioning portion, so as to position the two linear dimensions of the plane of the UAV. Alternatively, landing gear of the UAV are made as vertical columns, and conical pits are arranged at the same intervals on the landing pad, so that when the UAV lands on conical projected areas, it automatically slides to the bottoms of the conical pits and is fixed in three dimensions.

However, the traditional positioning solutions have defects as follows:

For the solution of a totally active mode, the disadvantage lies in that a relatively large number of actuators are needed. Since it is necessary to fix three dimensions of the UAV, the device for positioning and guiding the UAV is complicated, and thus the cost and complexity of the equipment are increased.

For the solution of a totally passive mode, the disadvantage lies in the large volume of the device. For example, a conical structure has a large occupied space, and it is difficult to make the equipment small.

SUMMARY

In view of the above-mentioned defects, the present disclosure to provide a positioning mechanism that requires a relatively small number of actuators and can reduce the volume of the UAV dock.

In accordance with the disclosure, there is provided a positioning mechanism comprising a base comprising a landing area and a guide member. The landing area comprises a positioning portion. The guide member is movably arranged at the landing area and comprises a guide surface. The guide member is configured to be movable with respect to the base. A height of the guide member relative to the landing area is configured to be lower when the guide member is in a non-operating state than when the guide member is in an operating state. The guide surface is configured to adjoin the positioning portion when the guide member is in the operating state.

Compared with traditional location technology, the above-mentioned positioning mechanism has at least the following advantages:

(1) the above-mentioned positioning mechanism guides a UAV to a positioning area by a guide member in a landing area, and positions the UAV by a positioning portion in the landing area or by means of the cooperation of the positioning portion and the guide member, thereby reducing the number of actuators for positioning compared with the solution of a totally active mode so as to reduce the cost and complexity of equipment.

(2) The above-mentioned guide member of the positioning mechanism is movably arranged in the landing area. The moving states of the guide member relative to the base include a non-operating state and an operating state. The height of the guide member in the non-operating state is less than the height thereof in the operating state, so as to reduce the space occupied by the guide member in the non-operating state, thereby facilitating the miniaturized design of equipment.

(3) The above-mentioned positioning mechanism guides the UAV to the positioning area by the guide member in the landing area, so that the UAV does not need to accurately land on the area where the positioning portion is located, thereby lowering the requirements for positioning and navigating precision of the landing of the UAV.

Also in accordance with the disclosure, there is provided a UAV dock comprising the above-mentioned positioning mechanism and an operating device for operating a UAV. The guide surface of the guide member is configured to allow the UAV to move through to the positioning portion. The operating device is configured to operate on the UAV positioned at the positioning portion.

Also in accordance with the disclosure, there is provided a positioning mechanism comprising a base provided with a landing area, with a positioning portion provided on the landing area and a guide member used for guiding a moving object to the positioning portion and movably arranged in the landing area. The states of movement and transformation of the guide member relative to the base include a non-operating state and an operating state, and the form of the guide member in the non-operating state is different from the form thereof in the operating state.

Also in accordance with the disclosure, there is provided a UAV dock comprising the above-mentioned positioning mechanism and an operating device for operating a UAV. The UAV moves to the positioning portion by means of the guide member, and the operating device operates on the UAV positioned at the positioning portion.

Also in accordance with the disclosure, there is provided a UAV replenishment method, comprising landing a UAV toward a landing area of a UAV dock; transforming the guide member in the landing area of the UAV dock into an operating state so as to guide the UAV to a positioning portion inside the landing area, the form of the guide member in the operating state being different from the form thereof in the non-operating state; and initiating replenishment for the UAV by the UAV dock.

DETAILED DESCRIPTION OF THE EMBODIMENTS

Figure 1:
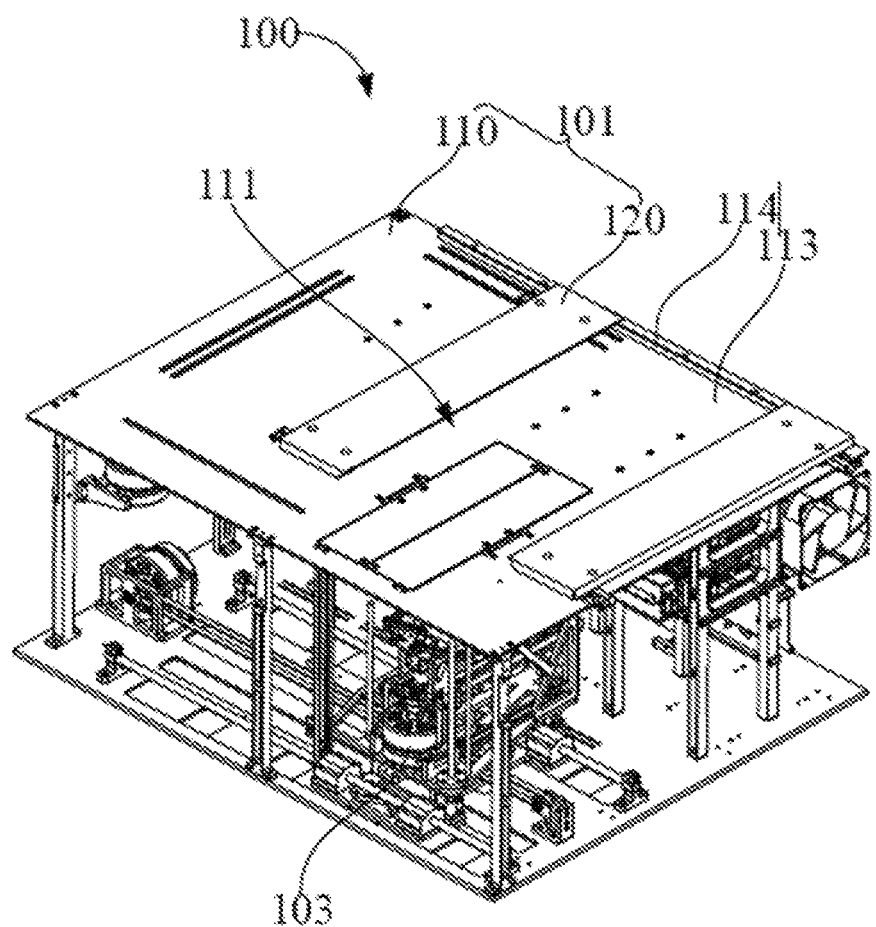
FIG. 1 is a perspective view of a UAV dock of an embodiment of the present disclosure when the dock is not in use.

Technical solutions of the present disclosure will be described with reference to the drawings. It will be appreciated that embodiments as described in the disclosure are some rather than all of the embodiments of the present disclosure. Other embodiments, which are conceived by those having ordinary skills in the art on the basis of the disclosed embodiments without inventive efforts, should fall within the scope of the present disclosure.

It is noted that, when a component is known to be "fixed to" another component, it can be directly on another component, or an intermediate component can be present. When a component is considered to be "connected" to another component, it can be directly connected to another component or an intermediate component can be present at the same time. The terms "vertical," "horizontal," "left," "right," and similar expressions used herein are intended for the purposes of illustration only.

Unless otherwise defined, all technical and scientific terms used herein have the same meaning as commonly understood by one of ordinary skill in the art. The terms used in the description of the present disclosure are for the purpose of describing particular embodiments and are not intended to limit the present disclosure. The term "and/or" used herein includes any and all combinations of one or more of the associated listed items.

The embodiments of the present disclosure provide a positioning mechanism comprising a base and a guide member. The base is provided with a landing area, with a positioning portion provided on the landing area. The guide member is movably arranged in the landing area, and the states of movement and transformation of the guide member relative to the base include a non-operating state and an operating state. A UAV can be guided to the positioning portion by the guide member, and is positioned by the positioning portion.

Based on the above-mentioned positioning mechanism, the embodiments of the present disclosure further provide a UAV dock using the above-mentioned positioning mechanism.

The UAV dock comprises the above-mentioned positioning mechanism and an operating device for operating a UAV. The UAV moves to the positioning portion through the guide surface of the guide member, and the operating device operates on the UAV positioned at the positioning portion.

In some of the embodiments, the operating device comprises an auxiliary mechanical structure for assisting the location of the UAV. For example, the auxiliary mechanical structure may be a uniaxial auxiliary mechanical structure, a biaxial auxiliary mechanical structure, or a triaxial auxiliary mechanical structure, etc.

In some of the embodiments, the operating device further comprises a raw material replenishment mechanism for replenishing functional raw materials for the UAV.

In some of the embodiments, the raw material replenishment mechanism further comprises a liquid raw material conveying port. For example, when the UAV uses a fuel oil power device, the raw material replenishment mechanism comprises a fuel oil conveying port.

In some of the embodiments, the raw material replenishment mechanism comprises a solid raw material conveying device. For example, when the UAV carries a spray device for spraying a powdered pesticide, the raw material replenishment mechanism comprises a pesticide conveying track or a pesticide box clamping device.

In some of the embodiments, the operating device comprises a replacing mechanism for replacing a load of the UAV. For example, the operating device comprises an auxiliary mechanical structure for replacing a gimbal mounted in the UAV.

In some of the embodiments, the guide member defines a portion of the positioning portion, and the size of the positioning portion can be adjusted by means of the movement and transformation of the guide member. For example, the guide member can translate in the landing area so as to adjust the size of the positioning portion, or the guide member is a retracting mechanism for adjusting the size of the positioning portion by means of the extension and retraction of the guide member.

Based on the above-mentioned UAV dock, the embodiments of the present disclosure further provide a UAV replenishment method. In the UAV replenishment method, the guide member in the landing area of the UAV dock is transformed into an operating state so as to guide the UAV to a positioning portion inside the landing area, and the height of the guide member in the operating state relative to the landing area is greater than the height thereof in the non-operating state relative to the landing area.

Some of the embodiments of the present disclosure are described in detail below with reference to the drawings.

Figure 2:
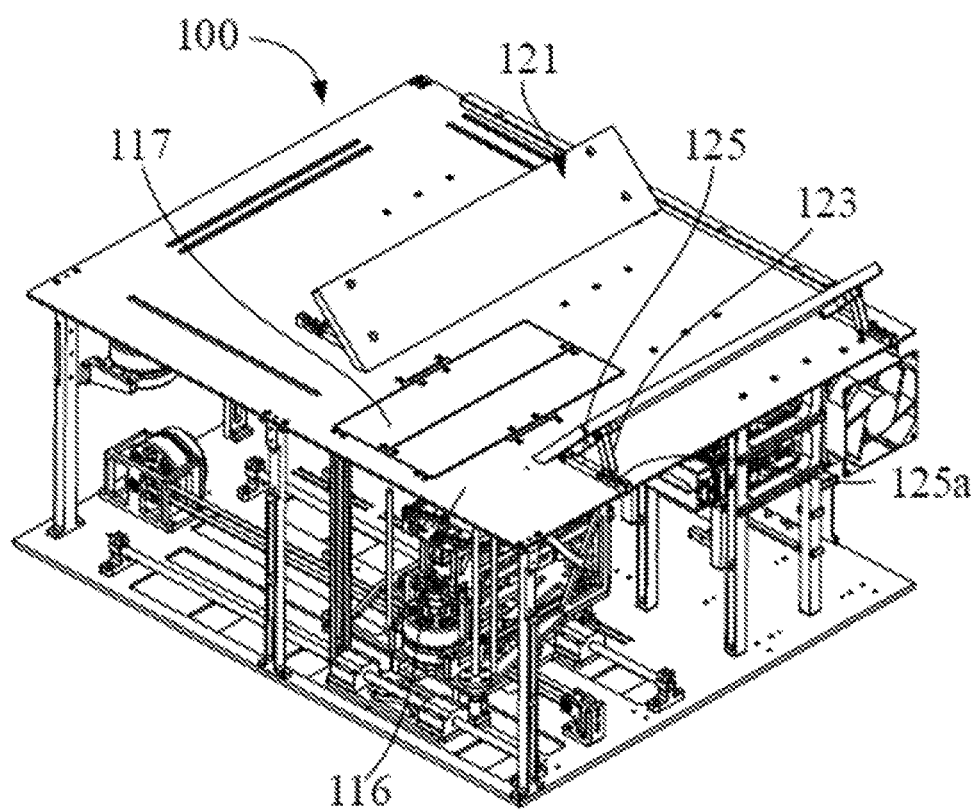
FIG. 2 is a perspective view of the UAV dock shown in FIG. 1 when the dock is in use.
Figure 3:
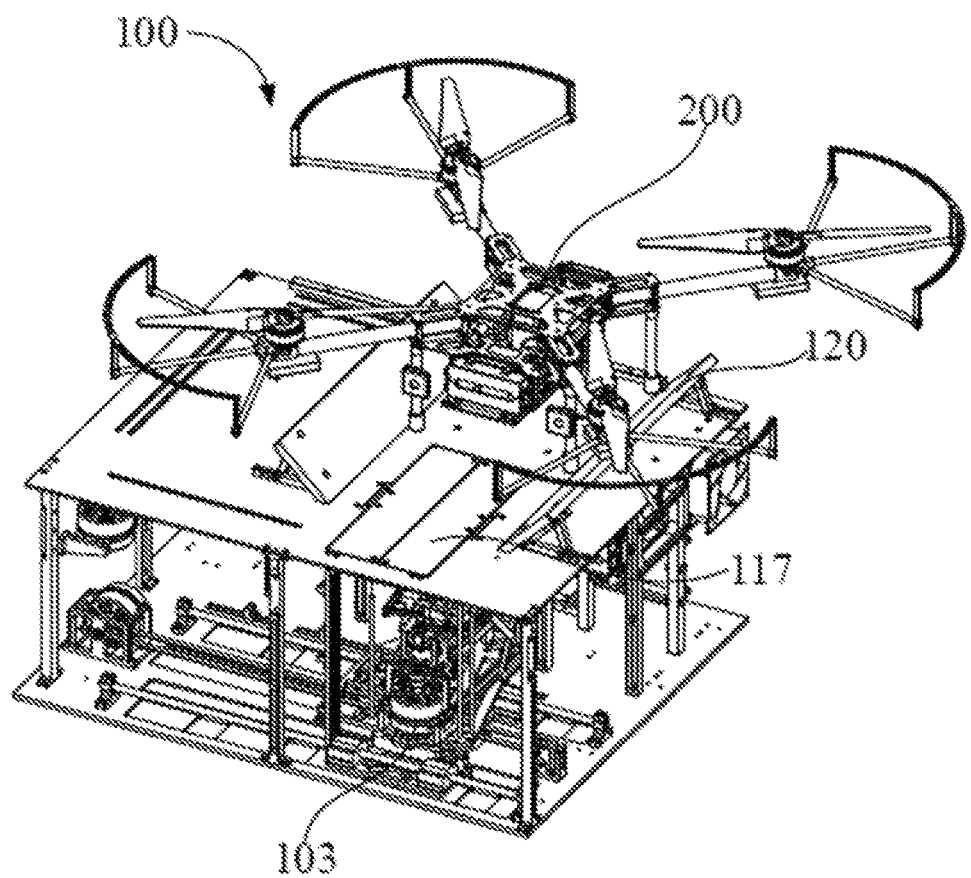
FIG. 3 is a state diagram when the UAV dock as shown in FIG. 1 positions a UAV.

Referring to FIGS. 1-3, a UAV dock 100 of an embodiment of the present disclosure comprises a positioning mechanism 101 and an operating device 103 for operating a UAV 200.

The positioning mechanism 101 comprises a base 110 and a guide member 120. The guide member 120 is used to guide the UAV 200 to a specified area in the base 110, and the guide member 120 can be transformed to reduce the space occupied by the guide member 120, thereby facilitating the miniaturized design of the positioning mechanism 101.

Specifically in the embodiments as shown in the drawings, the states of movement and transformation of the guide member 120 relative to the base 110 include a non-operating state and an operating state. The form of the guide member 120 in the non-operating state is different from the form thereof in the operating state. Specifically, the form refers to the height of the guide member 120 relative to the base 110.

The base 110 is provided with a landing area 111, the landing area 111 is provided with a positioning portion 113, and the positioning portion 113 is used for positioning the UAV 200.

The structure of the base 110 can be designed according to practical requirements. For example, in the embodiments as shown in the drawings, the base 110 is a frame of the UAV dock 100.

Specifically in the embodiments as shown in the drawings, the positioning portion 113 is a two-dimensional positioning portion used for two dimensions with respect to a positioning plane, and the two dimensions include a linear dimension and an angle.

Specifically, the positioning portion 113 is a positioning plane, and a bottom edge positioner 114 is provided on one side of the positioning plane. The number of guide members 120 is two. The two guide members 120 are respectively located on two opposite sides of the positioning portion 113, and guide surfaces 121 of the two guide members 120 are arranged to face each other. The positioning plane and the two guide members 120 and the bottom edge positioner 114 cooperatively position the UAV 200, so that the UAV 200 may only slide and cannot rotate between the two guide members 120.

Of course, the number of guide members 120 may also be one. For example, in other embodiments, an edge of the positioning plane is further provided with a side limiter. The side limiter and the guide member 120 are respectively located on two opposite sides of the positioning portion 113, and the guide surface of the guide member 120 and the side limiter are arranged to face each other.

Furthermore, the landing area 111 further comprises an operating region 116 adjoined by the positioning portion 113. The operating device 103 corresponds to the operating region 116, so as to perform operations relating to the UAV 200. The bottom edge positioner 114 is arranged on the side of the positioning portion 113 opposite the operating region 116.

Furthermore, the operating region 116 is provided with an operating flap door 117 through which the operating device 103 extends to the outside of the base 110. When the operating device 103 extends to the landing area 111 through the operating flap door 117, the operating flap door 117 is opened; and when the operating device 103 is withdrawn to the interior of the base 110 through the operating flap door 117, the operating flap door 117 is closed.

In other embodiments, the positioning portion 113 may be a positioning recess, and has a lengthwise direction and a widthwise direction, the dimension in the widthwise direction being approximately equal to the dimension to be positioned, and the dimension in the lengthwise direction being greater than the dimension to be positioned. For example, in one of the embodiments, the positioning portion 113 is a rectangular recess. The UAV 200 has a square landing gear, and the width of the landing gear of the UAV 200 is equal to an opening dimension of the square recess, so that the landing gear of the UAV 200 can slide in the rectangular recess in its lengthwise direction but cannot rotate.

The positioning portion 113 may also be a two-dimensional positioning portion used for two dimensions with respect to a positioning plane, and the two dimensions include two linear dimensions. In one of the embodiments, the positioning portion 113 is a positioning recess, and the positioning recess is adjoined by the guide surface 121 of the guide member 120. The dimension of the positioning recess is approximately equal to the dimension to be positioned. For example, in one of the embodiments, the positioning portion 113 is a square recess, the landing gear of the UAV 200 is also in a square shape, and the side length of the landing gear of the UAV 200 is equal to an opening dimension of the square recess.

The positioning portion 113 may also be a three-dimensional positioning portion 113 used for three dimensions with respect to a positioning space. For example, the positioning portion 113 is a positioning recess, the positioning recess is adjoined by the guide surface 121 of the guide member 120, and a side wall of the positioning recess is provided with a positioning pin that can be automatically ejected, so as to completely position the landing gear of the UAV 200 in the positioning recess, so that the positioning recess forms a three-dimensional positioning portion.

The guide member 120 is movably arranged in the landing area 111 of the base 110, and the guide member 120 comprises a guide surface 121. The moving states of the guide member 120 relative to the base 110 include a non-operating state and an operating state. The height of the guide member 120 in the non-operating state is less than the height thereof in the operating state, and the guide surface 121 in the operating state can be adjoined by the positioning portion 113.

The guide surface 121 may be a planar surface. Of course, the guide surface 121 may also be a curved surface. For example, the guide surface 121 includes at least one of a V-shaped convex surface, a V-shaped concave surface, an arc convex surface, an arc concave surface, a spherical convex surface, or a spherical concave surface.

The transformation of the guide member 120 can be designed according to different practical requirements, and a description is given below in conjunction with different embodiments.

The guide member 120 can be folded in the landing area 111. The operating state is a state in which guide member 120 is extended, and the non-operating state is a state in which the guide member 120 is folded. For example, in the embodiments as shown in the drawings, the guide member 120 may be a guide plate, the guide plate is rotatably connected to the base 110. The guide surface 121 is arranged on the surface of the guide plate. The operating state is a state in which the guide plate is inclined to the landing area 111 after the guide plate rotates relative to the base 110, and the non-operating state is a state in which the guide plate is parallel to the landing area 111 after the guide plate rotates.

Specifically, the guide plate is an inclined plate arranged on the dock and at a predetermined angle (e.g. 45°) with the horizontal plane, and the distance between the intersection of two inclined plates and the plane is the distance between the landing gear of the UAV 200. The width of a flat plate is determined in view of the accuracy of the pinpoint landing of the UAV 200. The outermost edge of the landing gear of the UAV 200 is designed as a rectangle. When the UAV 200 is landing, it may land in the range covered by the projection of inclined plates in the horizontal plane, and owing to the action of gravity, the UAV 200 will slide down to a position between two inclined plates and stop in the position of the intersection of two inclined plates with the plane, so as to achieve the two-dimensional (a linear dimension and a rotary dimension) positioning. When the equipment is not in use, the inclined plates can be easily folded until parallel with the plane, so as to save space and facilitate transport or storage.

The operating device 103 is a mechanical arm with a single degree of freedom arranged on the UAV dock 100, and the UAV 200 can be pushed to the desired position by the mechanical arm with a single degree of freedom so as to accomplish the positioning in the other linear dimension. With this, the accurate positioning of the UAV 200 in the landing area 111 of the UAV dock 100 has been achieved.

In the above-mentioned embodiments, this is a semi-passive positioning solution, and the advantage lies in a simple structure that needs only one actuator (if a triaxial mechanical arm is used, it can be achieved using one of the degrees of freedom of the mechanical arm without providing an additional actuator). It is also superior in space occupation, i.e. When not in use, it can be folded into a small space.

It shall be explained that the guide member 120 can be folded manually as well as automatically. For example, in the embodiments as shown in the drawings, the positioning mechanism 101 further comprises a connecting rod 123 and a positioning guide rail 125. The positioning guide rail 125 is provided with a plurality of limiting portions 125*a* arranged at intervals, and one end of the connecting rod 123 is rotatably connected to the guide member 120, and the other end thereof selectively engages with the plurality of limiting portions 125*a* so as to support the guide member 120. Specifically, the limiting portion 125*a* is a limiting recess.

In another embodiment, the positioning mechanism 101 further comprises a driving member, and the driving member 223 drives the guide member 120 to rotate relative to the base 110.

Figure 4:
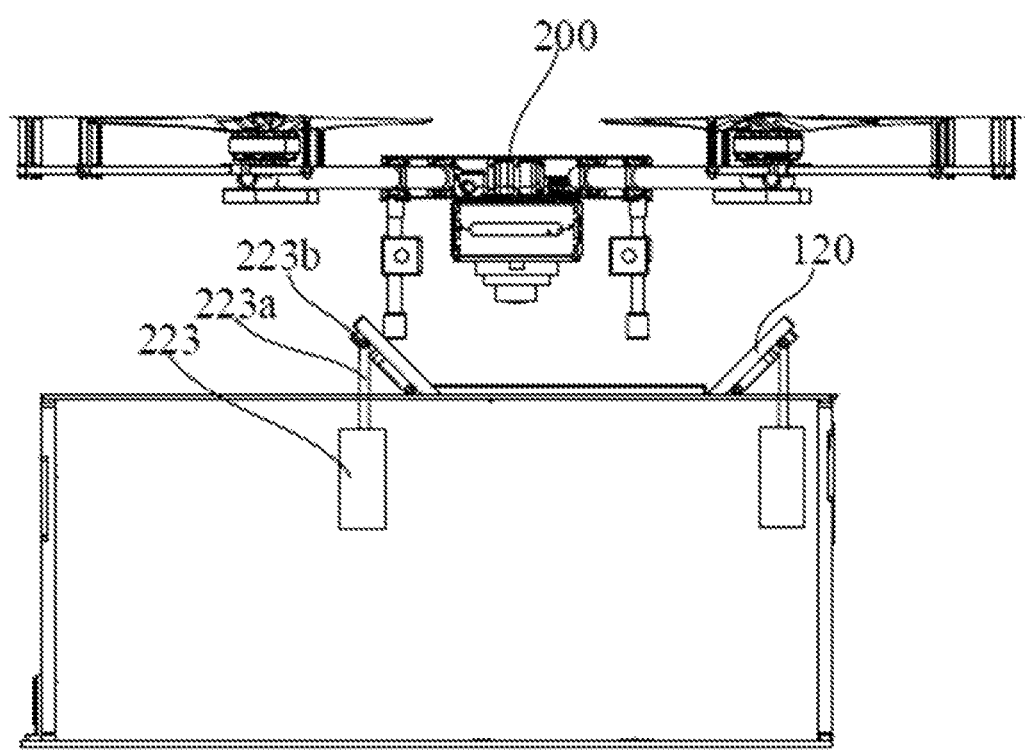
FIG. 4 is a structural schematic view of a UAV dock of another embodiment.

As shown in FIG. 4, the driving member may be a telescopic cylinder 223, a free end of a telescopic rod 223*a* of the telescopic cylinder 223 is rotatably connected to the guide plate, and the free end of the telescopic rod 223*a* of the telescopic cylinder 223 can slide along the guide plate. For example, the free end of the telescopic rod 223*a* of the telescopic cylinder 223 is provided with two lugs 223*b*. The back surface of the guide member 120 opposite the guide surface 121 is provided with two sliding grooves arranged to face each other. The two lugs 223*b* are respectively arranged in the two sliding grooves, and the lugs 223*b* can both rotate in the sliding grooves and slide along the sliding grooves.

Figure 5:
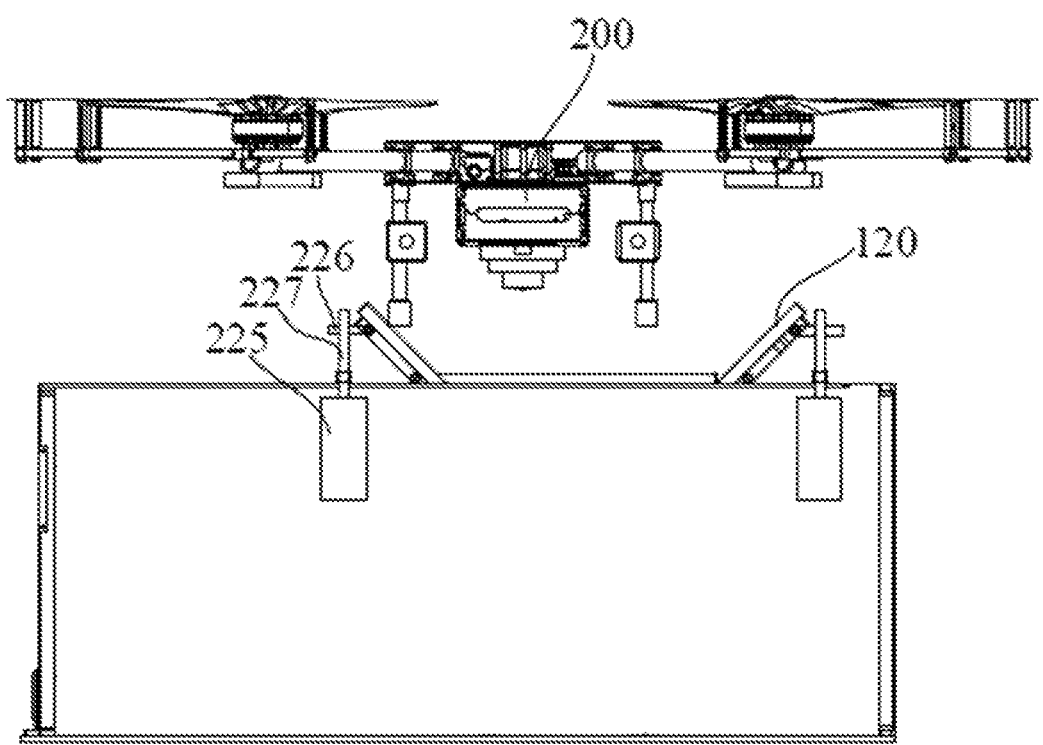
FIG. 5 is a structural schematic view of a UAV dock of another embodiment.

As shown in FIG. 5, the driving member may also be a motor 225. The positioning mechanism 101 further comprises a screw nut 226 and a screw rod 227, and the screw rod 227 is coaxially and fixedly connected to a drive shaft of the motor 225. The screw nut 226 is sheathed on the screw rod 227, and is slidably connected to the guide plate. The motor 225 drives the screw rod 227 to rotate, and the screw nut 226 is in a threaded fit with the screw rod 227, so that the screw nut 226 moves along the screw rod 227, and the screw nut 226 drives the guide plate to rotate.

Alternatively, the guide member 120 is provided with a pivot shaft. The guide member 120 rotates along with the pivot shaft, and the drive shaft of the motor 225 is coaxially connected to the pivot shaft and drives the pivot shaft to rotate, so as to drive the guide member 120 to rotate.

Alternatively, the guide member 120 is provided with a pivot shaft. The guide member 120 rotates along with the pivot shaft, and the drive shaft of the motor rotates synchronously with the pivot shaft by a synchronous belt, so as to drive the guide member 120 to rotate in the base 110.

Figure 6:
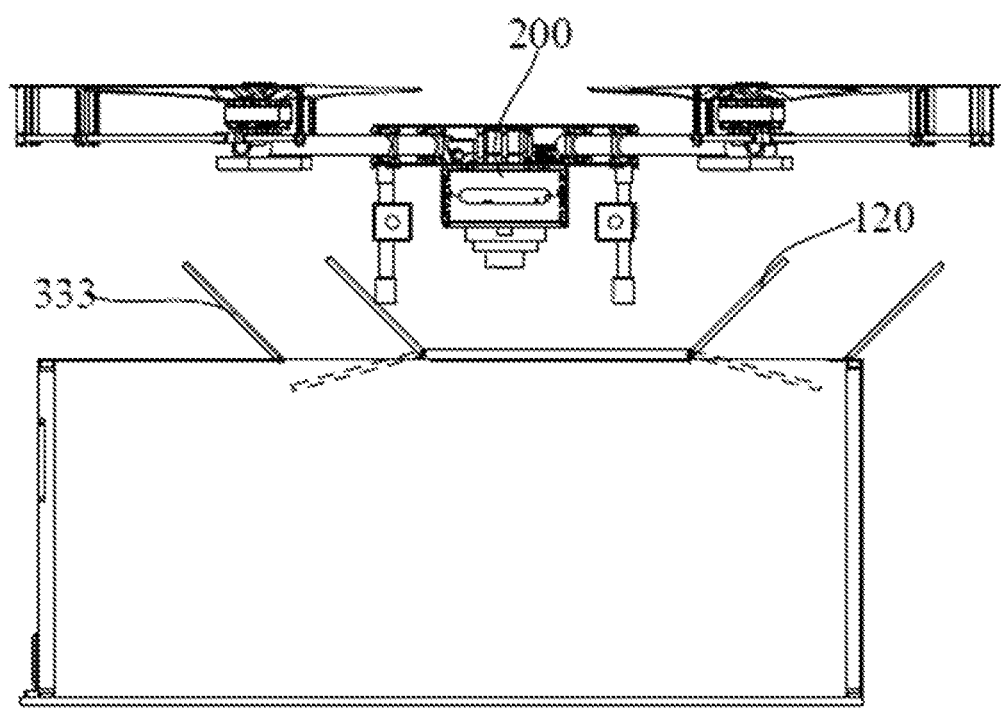
FIG. 6 is a structural schematic view of a UAV dock of another embodiment.

The guide member 120 may also be folded in the base 110. The operating state is a state in which the guide member 120 extends out of the base 110, and the non-operating state is a state in which the guide member 120 is folded inside the base 110. For example, as shown in FIG. 6, in one of the embodiments, the landing area 111 is provided with a mounting flap door 333, and the guide member 120 extends from the inside of the base 110 to the landing area 111 through the mounting flap door 333.

Furthermore, also comprised is a driving member which drives the guide member 120 to extend from the mounting flap door 333 to the landing area 111.

The driving member may be a telescopic cylinder, and a free end of a telescopic rod of the telescopic cylinder is movably connected to the guide member 120, so as to drive the guide member 120 to rotate in the base 110.

The driving member may also be a motor. The positioning mechanism 101 may further include a screw rod and a screw nut, and the screw rod is coaxially and fixedly connected to the drive shaft of the motor. The screw nut is sheathed on the screw rod, and is slidably hinged with the guide member 120. The motor drives the screw rod to rotate. The screw nut is in a threaded fit with the screw rod so that the screw nut moves along the screw rod, and the screw nut drives the guide plate to rotate in the base 110.

Alternatively, the guide member 120 is provided with a pivot shaft. The guide member 120 rotates along with the pivot shaft. The drive shaft of the motor is coaxially connected to the pivot shaft and drives the pivot shaft to rotate, so as to drive the guide member 120 to rotate in the base 110.

Alternatively, the guide member 120 is provided with a pivot shaft. The guide member 120 rotates along with the pivot shaft, and the drive shaft of the motor rotates synchronously with the pivot shaft by a synchronous belt, so as to drive the guide member 120 to rotate in the base 110.

Figure 7:
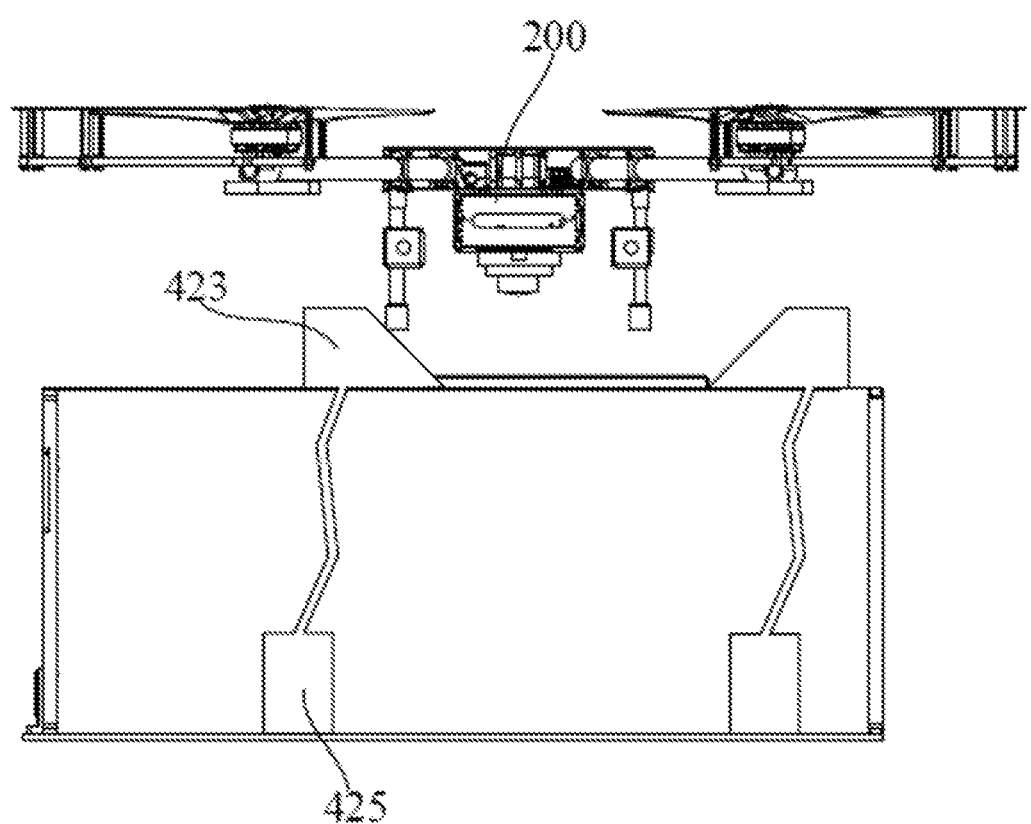
FIG. 7 is a structural schematic view of a UAV dock of another embodiment.

The guide member 120 may also reduce its own volume. The operating state is a state in which the guide member 120 has extended the volume, and the non-operating state is a state in which the guide member 120 has reduced the volume. For example, as shown in FIG. 7, in one of the embodiments, the guide member 120 comprises an inflatable airbag 423 and an inflation device 425 connected to the inflatable airbag 423. The operating state is a state in which the inflatable airbag 423 is inflated, and the non-operating state 425 is a state in which the inflatable airbag 423 is deflated.

Furthermore, the guide member 120 defines a portion of the positioning portion 113, and the size of the positioning portion 113 can be adjusted by the movement and transformation of the guide member 120, so as to adapt to different models of UAV. For example, in the embodiments as shown in the drawings, the guide member 120 forms a limiting edge for one side of the positioning portion 113, and when the guide member 120 is rotated or translated, the size of the positioning portion 113 can be changed. Alternatively, the guide member 120 can extend and retract itself, so as to change the size of the positioning portion 113.

The UAV 200 moves to the positioning portion 113 by the guide surface 121 of the guide member 120, and the operating device 103 operates on the UAV 200, which is at the positioning portion 113.

The operating device 103 may comprise an auxiliary mechanical structure for assisting the positioning of the UAV 200. For example, the auxiliary mechanical structure can extend and retract relative to the positioning portion 113, so as to push the UAV 200 until the UAV 200 is cooperatively positioned by the positioning portion 113 and the auxiliary mechanical structure. Alternatively, the auxiliary mechanical structure may also clamp the UAV 200 to position the UAV 200. Alternatively, the auxiliary mechanical structure comprises a battery grabbing mechanism for grabbing a battery, and a clamping mechanism for positioning the UAV 200. The specific structure of the auxiliary mechanical structure can be designed according to different requirements. For example, the auxiliary mechanical structure may be a manipulator.

Furthermore, the operating device 103 further comprises a raw material replenishment mechanism for replenishing functional raw materials for the UAV 200. The raw material replenishment mechanism comprises at least one of a liquid raw material conveying port or a solid raw material conveying device. The liquid raw material conveying port is used for replenishing a liquid raw material, e.g. gasoline, a detergent, or an insecticide, for the UAV 200. The solid raw material conveying device is used for replenishing a solid raw material, e.g. a powdered pesticide or fire-extinguishing powder, for the UAV 200.

Furthermore, the operating device 103 comprises a replacing mechanism for replacing a load of the UAV 200. The replacing mechanism may be an auxiliary mechanical structure for replacing a gimbal of the UAV 200, or may be an auxiliary mechanical structure for replacing an ultrasonic cleaning device of the UAV 200.

It shall be explained that the positioning portion 113 of the base 110 is not limited to a positioning plane or a positioning recess, and may also be a mechanical positioning structure. The mechanical positioning structure may be a structure such as a positioning frame or a positioning convex column.

The form of the guide member 120 is not limited to the height of the guide member 120 relative to the landing area 111, and may be another form. For example, the form may be a projected area of the guide member 120 in the landing area 111. For example, in the embodiments as shown in the drawings, the guide member 120 is a plate having a rectangular projection in the landing area 111, and the projected area of the guide member 120 in the non-operating state is greater than the projected area thereof in the operating state.

The form may also be a projected length of the guide member 120 in the landing area 111, or a projected width of the guide member 120 in the landing area 111. For example, in the embodiments as shown in the drawings, the guide member 120 is a plate having a rectangular projection in the landing area 111, and the projected width of the guide member 120 in the non-operating state is greater than the projected width thereof in the operating state.

The form may be a projected shape of the guide member 120 in the landing area 111. For example, in the embodiments as shown in the drawings, if the guide member 120 is a square plate, the guide member 120 has a square projection in the non-operating state, and has a rectangular projection in the operating state.

The form may also be an angle of the guide member 120 relative to the landing area 111 or a position of the guide member 120 relative to the landing area 111. For example, in one of the embodiments, the guide member 120 is rotatably connected to the base 110, and can turn to the inside of the base 110. The guide member 120 is located below the landing area 111 when it is in the non-operating state, and is located above the landing area 111 when it is in the operating state.

The form may also be the volume of the guide member 120 itself. For example, in one of the embodiments, the guide member 120 comprises an inflatable airbag, and the guide member 120 has a reduced volume in the non-operating state, and has an increased volume in the operating state.

The movable connection between the guide member 120 and the base 110 is not limited to those in the embodiments as shown in the drawings. That is, the guide member 120 and the base 110 may be in a rotatable connection or another connection may be used. For example, the guide member 120 is in a slidable connection with the base 110, the guide member 120 is in a telescopic connection with the base 110, or the guide member 120 can move from the inside of the base 110 to the outside of the base 110.

The movement and transformation of the guide member 120 are not limited to those in the embodiments as shown in the drawings. That is, the guide member 120 rotates relative to the base 110, or may be another transformation. For example, the guide member 120 translates relative to the landing area 111, the guide member 120 turns relative to the landing area 111, the guide member 120 lifts relative to the landing area 111, the guide member 120 extends or retracts itself, or the guide member 120 changes its own volume.

Compared with the traditional UAV dock 100, the above-mentioned UAV dock 100 has at least the following advantages:

(1) the above-mentioned positioning mechanism 101 guides a UAV 200 to a positioning area by a guide member 120 in a landing area 111, and positions the UAV 200 by a positioning portion 113 in the landing area 111 or by means of the cooperation of the positioning portion 113 and the guide member 120, thereby reducing the number of actuators for positioning compared with the solution of a totally active mode so as to reduce the cost and complexity of equipment.

(2) The above-mentioned guide member 120 of the positioning mechanism 101 is movably arranged in the landing area 111. The moving states of the guide member 120 relative to the base 110 include a non-operating state and an operating state, and the height of the guide member 120 in the non-operating state is less than the height thereof in the operating state, so as to reduce the space occupied by the guide member 120 in the non-operating state, thereby facilitating the miniaturized design of equipment.

(3) The above-mentioned positioning mechanism 101 guides the UAV 200 to the positioning area by the guide member 120 in the landing area 111, so that the UAV 200 does not need to accurately land on the area where the positioning portion 113 is located, thereby lowering the requirements for positioning and navigating precision of the landing of the UAV 200.

Corresponding to the above-mentioned UAV dock 100, the present disclosure further provides a UAV replenishment method.

Figure 8:
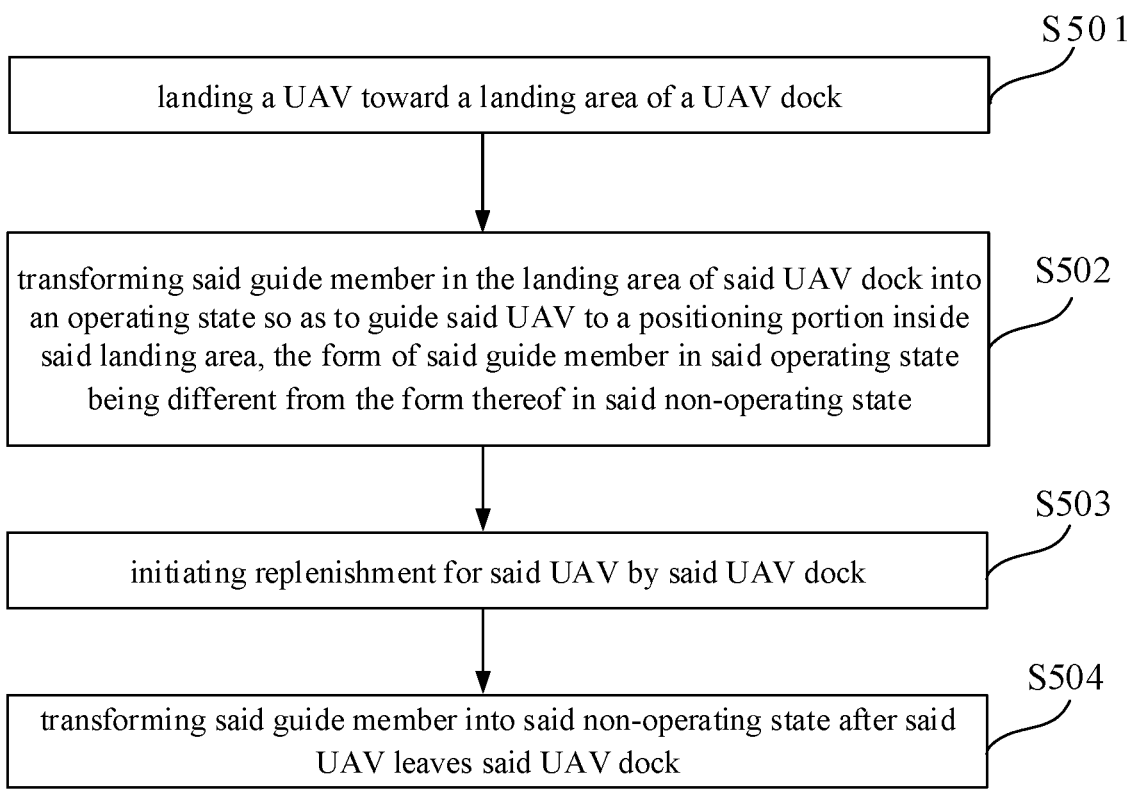
FIG. 8 is a flow chart of a UAV replenishment method of an embodiment of the present disclosure.

Referring to FIG. 8, the UAV replenishment method of the embodiments of the present disclosure comprises:

S501, a UAV 200 lands toward a landing area 111 of a UAV dock 100.

The UAV dock 100 is provided with a guide device for guiding the landing of the UAV 200, so that the UAV 200 can automatically land toward the landing area 111 of the UAV dock 100. For example, the UAV dock 100 is provided with a GPS transmitter. The UAV 200 is navigated to land on the landing area 111 of the UAV dock 100 by means of GPS navigation. Alternatively, the landing area 111 of the UAV dock 100 is provided with an identification feature. The UAV 200 is provided with a binocular visual sensor, and calibration is performed for the identification feature on the landing area 111 by the binocular visual sensor, so as to guide the UAV 200 to automatically land on the landing area 111 of the UAV dock 100.

Of course, the UAV 200 may also be manually guided to land on the landing area 111 of the UAV dock 100.

S502, the guide member 120 inside the landing area 111 of the UAV dock 100 is transformed into the operating state, so as to guide the UAV 200 to the positioning portion 113 inside the landing area 111, and the form of the guide member 120 in the operating state is different from the form thereof in the non-operating state. Specifically in the embodiments as shown in the drawings, the height of the guide member 120 in the operating state relative to the landing area 111 is greater than the height thereof in the non-operating state relative to the landing area 111.

Figure 9:
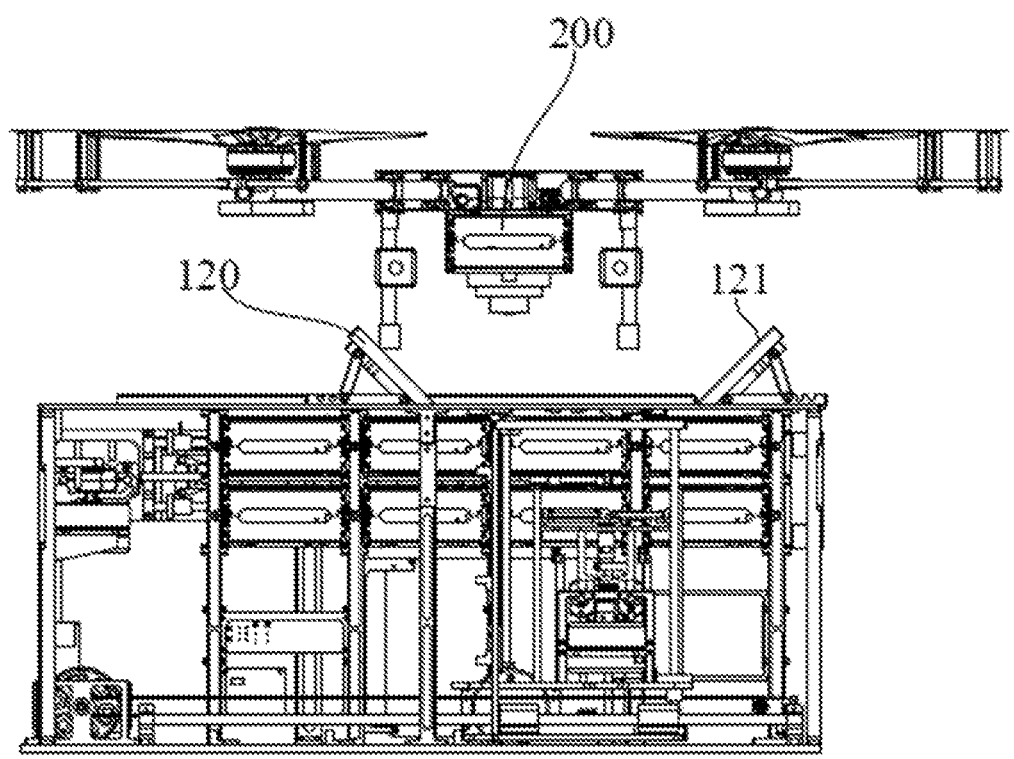
FIGS. 9-12 are views of the use states of a UAV dock in the UAV replenishment method as shown in FIG. 8.
Figure 10:
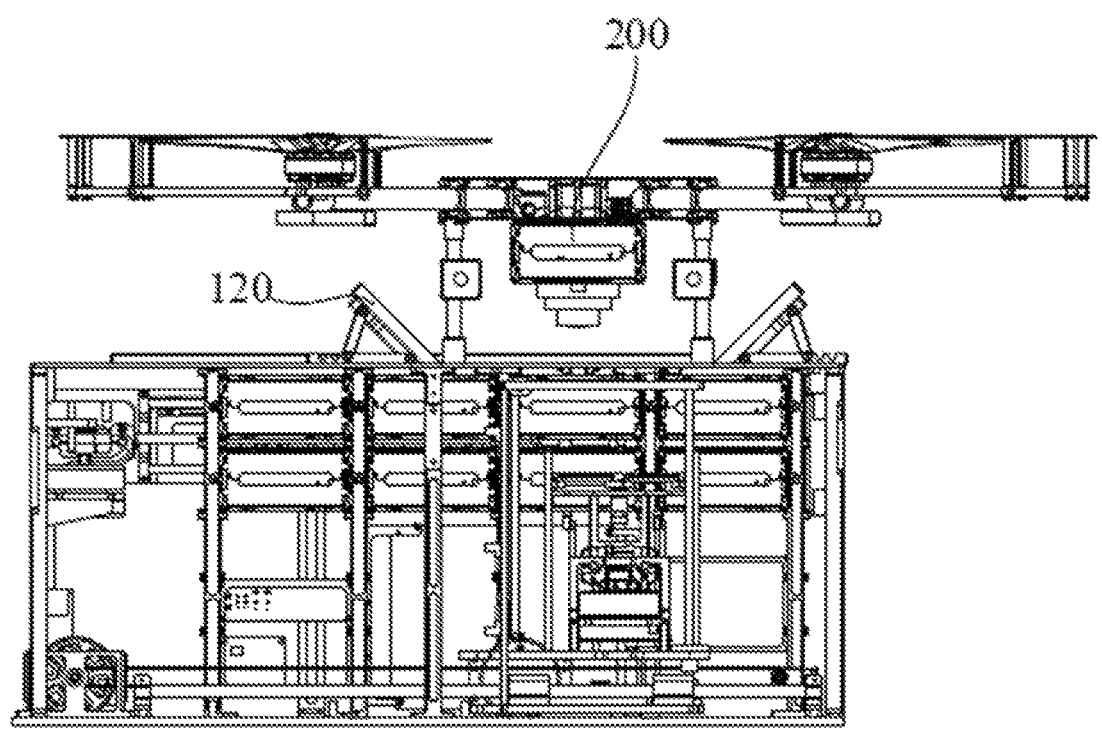
Figure 11:
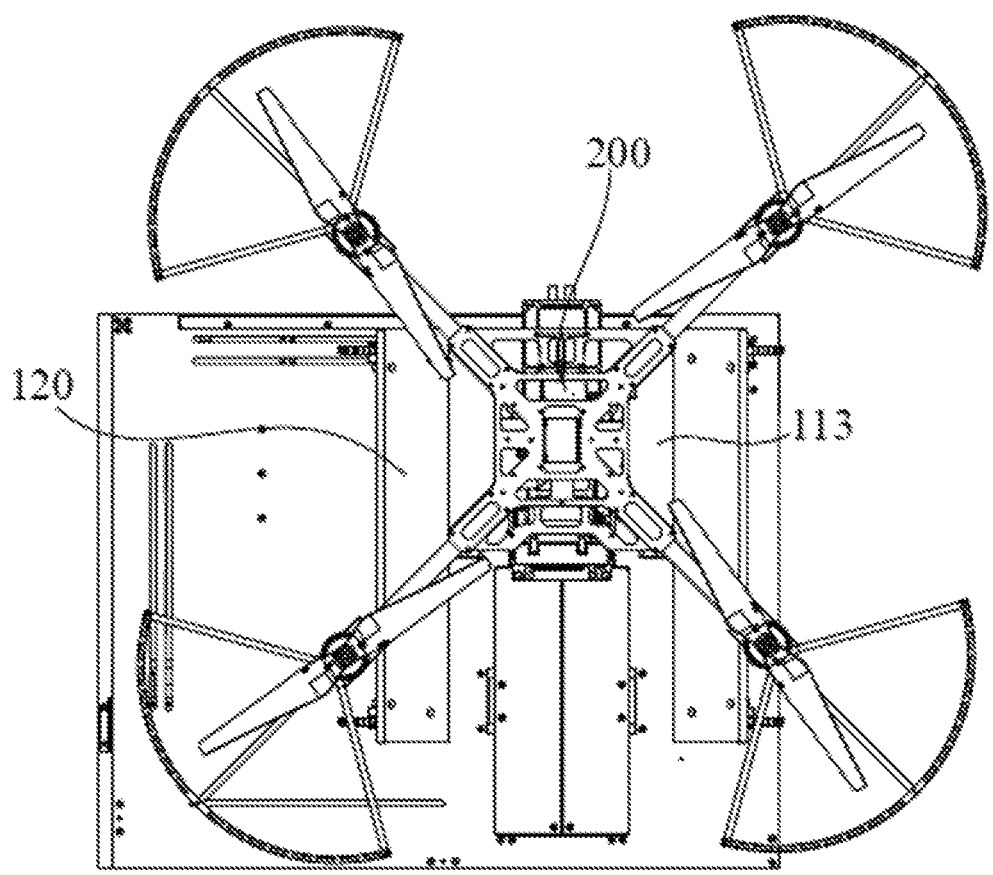

As shown in FIGS. 9-11, when the UAV 200 lands on the area where the guide member 120 of the landing area 111 is located, the UAV 200 is guided to the positioning portion 113 by the guide member 120, while the UAV 200 does not need to accurately land on the area where the positioning portion 113 is located.

Specifically in the embodiments as shown in the drawings, the positioning portion 113 is a two-dimensional positioning portion used for two dimensions with respect to a positioning plane, and the two dimensions include a linear dimension and an angle.

Specifically, the positioning portion 113 is a positioning plane, and a bottom edge positioner 114 is provided on one side of the positioning plane. The number of guide members 120 is two. The two guide members 120 are respectively located on two opposite sides of the positioning portion 113, and guide surfaces 121 of the two guide member 120 are arranged to face each other. The positioning plane and the two guide members 120 and the bottom edge positioner 114 cooperatively position the UAV 200, so that the UAV 200 may only slide and cannot rotate between the two guide members 120.

Of course, the number of guide members 120 may also be one. For example, in other embodiments, an edge of the positioning plane is further provided with a side limiter. The side limiter and the guide member 120 are respectively located on two opposite sides of the positioning portion 113, and the guide surface of the guide member 120 and the side limiter are arranged to face each other.

Furthermore, the landing area 111 further comprises an operating region 116 adjoined by the positioning portion 113. The operating device 103 corresponds to the operating region 116, so as to perform operations relating to the UAV 200. The bottom edge positioner 114 is arranged on the side of the positioning portion 113 opposite the operating region 116.

Furthermore, the operating region 116 is provided with an operating flap door 117 through which the operating device 103 extends to the outside of the base 110. When the operating device 103 extends to the landing area 111 through the operating flap door 117, the operating flap door 117 is opened; and when the operating device 103 is withdrawn to the interior of the base 110 through the operating flap door 117, the operating flap door 117 is closed.

In other embodiments, the positioning portion 113 may be a positioning recess, and has a lengthwise direction and a widthwise direction, the dimension in the widthwise direction being approximately equal to the dimension to be positioned, and the dimension in the lengthwise direction being greater than the dimension to be positioned. For example, in one of the embodiments, the positioning portion 113 is a rectangular recess, the UAV 200 has a square landing gear, and the width of the landing gear of the UAV 200 is equal to an opening dimension of the square recess, so that the landing gear of the UAV 200 can slide in the rectangular recess in its lengthwise direction but cannot rotate.

The positioning portion 113 may also be a two-dimensional positioning portion used for two dimensions with respect to a positioning plane, and the two dimensions include two linear dimensions. In one of the embodiments, the positioning portion 113 is a positioning recess, and the positioning recess is adjoined by the guide surface 121 of the guide member 120. The dimension of the positioning recess is approximately equal to the dimension to be positioned. For example, in one of the embodiments, the positioning portion 113 is a square recess. The landing gear of the UAV 200 is also of a square shape, and the side length of the landing gear of the UAV 200 is equal to an opening dimension of the square recess.

The positioning portion 113 may also be a three-dimensional positioning portion 113 used for three dimensions with respect to a positioning space. For example, the positioning portion 113 is a positioning recess. The positioning recess is adjoined by the guide surface 121 of the guide member 120. A side wall of the positioning recess is provided with a positioning pin that can be automatically ejected, so as to completely position the landing gear of the UAV 200 in the positioning recess, so that the positioning recess forms a three-dimensional positioning portion.

The guide member 120 is movably arranged in the landing area 111 of the base 110, and the guide member 120 comprises a guide surface 121. The moving states of the guide member 120 relative to the base 110 include a non-operating state and an operating state. The height of the guide member 120 in the non-operating state is less than the height thereof in the operating state, and the guide surface 121 in the operating state can be adjoined by the positioning portion 113.

The guide surface 121 may be a planar surface. Of course, the guide surface 121 may also be a curved surface. For example, the guide surface 121 includes at least one of a V-shaped convex surface, a V-shaped concave surface, an arc convex surface, an arc concave surface, a spherical convex surface, or a spherical concave surface.

The transformation of the guide member 120 can be designed according to different practical requirements, and a description is given below in conjunction with different embodiments.

The guide member 120 can be folded in the landing area 111. The operating state is a state in which guide member 120 is extended, and the non-operating state is a state in which the guide member 120 is folded. For example, in the embodiments as shown in the drawings, the guide member 120 may be a guide plate. The guide plate is rotatably connected to the base 110. The guide surface 121 is arranged on the surface of the guide plate. The operating state is a state in which the guide plate is inclined to the landing area 111 after the guide plate rotates relative to the base 110, and the non-operating state is a state in which the guide plate is parallel to the landing area 111 after the guide plate rotates.

Specifically, the guide plate is an inclined plate arranged on the dock and at a predetermined angle (e.g. 45°) with the horizontal plane, and the distance between the intersections of two inclined plates with the plane is the distance between the landing gear of the UAV 200. The width of a flat plate is determined in view of the accuracy of the pinpoint landing of the UAV 200. The outermost edge of the landing gear of the UAV 200 is designed as a rectangle. When the UAV 200 is landing, it may land in the range covered by the projection of inclined plates in the horizontal plane, and owing to the action of gravity, the UAV 200 will slide to a position between two inclined plates and stop in a position of the intersection of two inclined plates with the plane, so as to achieve the two-dimensional (a linear dimension and a rotary dimension) positioning. When the equipment is not in use, the inclined plates can be easily folded until parallel with the plane, so as to save space and facilitate transport or storage.

The operating device 103 is a mechanical arm with a single degree of freedom arranged on the UAV dock 100, and the UAV 200 can be pushed to the desired position by the mechanical arm with a single degree of freedom so as to accomplish the positioning in the other linear dimension. With this, the accurate positioning of the UAV 200 in the landing area 111 of the UAV dock 100 has been achieved.

In the above-mentioned embodiments, this is a semi-passive positioning solution, and the advantage lies in a simple structure that needs only one actuator (if a triaxial mechanical arm is used, it can be achieved using one of the degrees of freedom of the mechanical arm without providing an additional actuator). It is also superior in space occupation, i.e. when not in use, it can be folded into a small space.

It shall be explained that the guide member 120 can be folded manually as well as automatically. For example, in the embodiments as shown in the drawings, the positioning mechanism 101 further comprises a connecting rod 123 and a positioning guide rail 125, the positioning guide rail 125 is provided with a plurality of limiting portions 125a arranged at intervals, and one end of the connecting rod 123 is rotatably connected to the guide member 120, and the other end thereof selectively engages with the plurality of limiting portions 125a so as to support the guide member 120. Specifically, the limiting portion 125a is a limiting recess.

In another embodiment, the positioning mechanism 101 further comprises a driving member, and the driving member 223 drives the guide member 120 to rotate relative to the base 110.

As shown in FIG. 4, the driving member may be a telescopic cylinder 223, a free end of a telescopic rod 223a of the telescopic cylinder 223 is rotatably connected to the guide plate, and the free end of the telescopic rod 223a of the telescopic cylinder 223 can slide along the guide plate. For example, the free end of the telescopic rod 223a of the telescopic cylinder 223 is provided with two lugs 223b. The back surface of the guide member 120 opposite the guide surface 121 is provided with two sliding grooves arranged to face each other. The two lugs 223b are respectively arranged in the two sliding grooves, and the lugs 223b can both rotate in the sliding grooves and slide along the sliding grooves.

As shown in FIG. 5, the driving member may also be a motor 225. The positioning mechanism 101 further comprises a screw nut 226 and a screw rod 227, and the screw rod 227 is coaxially and fixedly connected to a drive shaft of the motor 225. The screw nut 226 is sheathed on the screw rod 227, and is slidably connected to the guide plate. The motor 225 drives the screw rod 227 to rotate. The screw nut 226 is in a threaded fit with the screw rod 227, so that the screw nut 226 moves along the screw rod 227, and the screw nut 226 drives the guide plate to rotate.

Alternatively, the guide member 120 is provided with a pivot shaft, and the guide member 120 rotates along with the pivot shaft, and the drive shaft of the motor 225 is coaxially connected to the pivot shaft and drives the pivot shaft to rotate, so as to drive the guide member 120 to rotate.

The guide member 120 may also be folded in the base 110. The operating state is a state in which the guide member 120 extends out of the base 110, and the non-operating state is a state in which the guide member 120 is folded inside the base 110. For example, as shown in FIG. 6, in one of the embodiments, the landing area 111 is provided with a mounting flap door 333, and the guide member 120 extends from the inside of the base 110 to the landing area 111 through the mounting flap door 333.

Furthermore, also comprised is a driving member which drives the guide member 120 to extend from the mounting flap door 333 to the landing area 111.

The driving member may be a telescopic cylinder, and a free end of a telescopic rod of the telescopic cylinder is movably connected to the guide member 120, so as to drive the guide member 120 to rotate relative to the base 110.

The driving member may also be a motor. The positioning mechanism 101 may further include a screw rod and a screw nut, and the screw rod is coaxially and fixedly connected to the drive shaft of the motor. The screw nut is sheathed on the screw rod, and is slidably hinged with the guide member 120. The motor drives the screw rod to rotate. The screw nut is in a threaded fit with the screw rod so that the screw nut moves along the screw rod, and the screw nut drives the guide plate to rotate.

Alternatively, the guide member 120 is provided with a pivot shaft, and the guide member 120 rotates along with the pivot shaft. The drive shaft of the motor is coaxially connected to the pivot shaft and drives the pivot shaft to rotate, so as to drive the guide member 120 to rotate.

The guide member 120 may also reduce its own volume. The operating state is a state in which the guide member 120 has extended the volume, and the non-operating state is a state in which the guide member 120 has reduced the volume. For example, as shown in FIG. 7, in one of the embodiments, the guide member 120 comprises an inflatable airbag 423 and an inflation device 425 connected to the inflatable airbag 423. The operating state is a state in which the inflatable airbag 423 is inflated, and the non-operating state 425 is a state in which the inflatable airbag 423 is deflated.

S503, the UAV dock 100 begins replenishment for the UAV 200.

Figure 12:
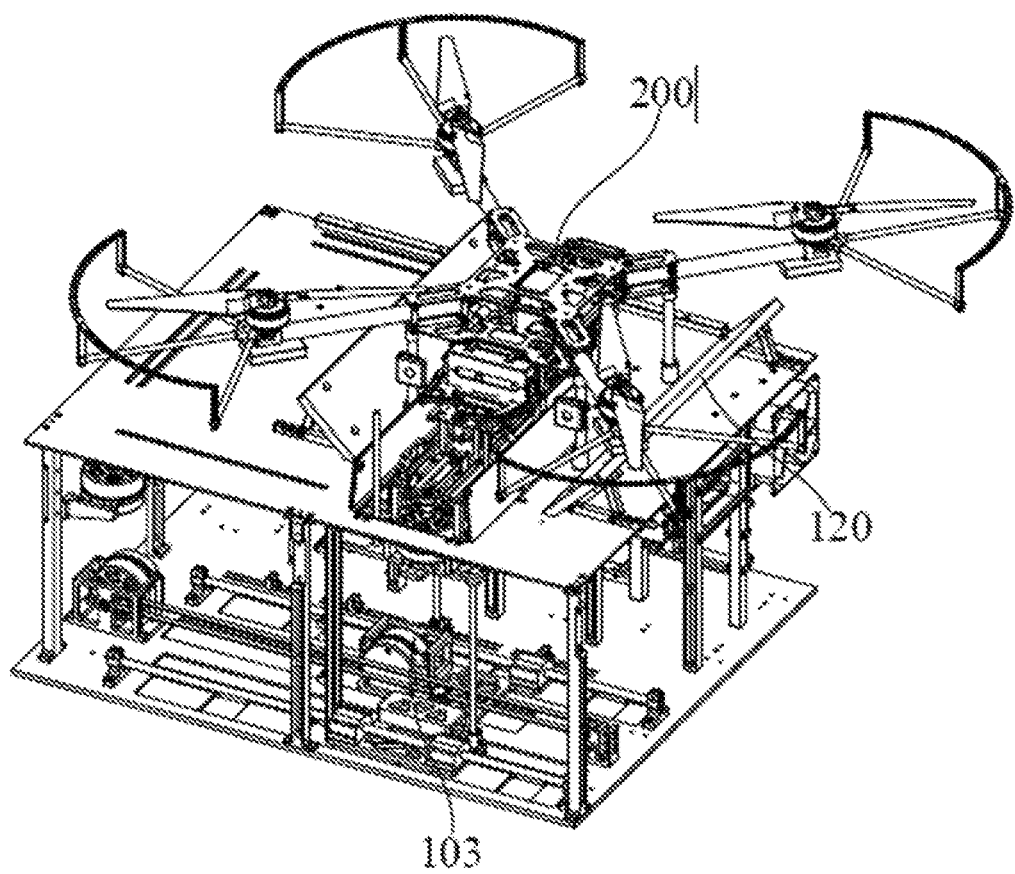

As shown in FIG. 12, when the positioning portion 113 in the landing area 111 of the UAV dock 100 positions the UAV 200, replenishment is performed for the UAV 200. For example, the UAV dock 100 may perform power replenishment for the UAV 200. Alternatively, the UAV dock 100 may replace a load for the UAV 200. Alternatively, the UAV dock 100 may replenish functional raw materials for the UAV 200.

S504, after the UAV 200 leaves the UAV dock 100, the guide member 120 is transformed into the non-operating state.

Specifically, when the replenishment for the UAV 200 in the landing area of the UAV dock 100 is finished, the UAV takes off again from the landing area of the UAV dock 100. After the UAV 200 takes off, the guide member 120 is transformed into the non-operating state again, so as to reduce the total space occupied by the UAV dock 100.

The foregoing disclosure is merely illustrative of the embodiments of the disclosure but not intended to limit the scope of the disclosure. Any equivalent modifications to a structure or process flow, which are made without departing from the specification and the drawings of the disclosure, and a direct or indirect application in other relevant technical fields, shall also fall into the scope of the disclosure.

What is claimed is:

1. A positioning mechanism comprising:
   a base including a landing area, the landing area including a positioning portion;
   a guide member movably arranged at the landing area and configured to guide a moving object, wherein the guide member being configured to be in a non-operating state or an operating state relative to the base, a form of the guide member in the non-operating state being different from the form of the guide member in the operating state, and the guide member including a guide surface; and an operating device for operating the moving object, the operating device including a mechanical arm configured to, after the moving object moves to the positioning portion through the guide surface of the guide member, push the moving object to a desired position, and the operating device being capable of operating on the moving object when the moving object is positioned at the positioning portion.

2. The positioning mechanism according to claim 1, wherein the positioning portion includes at least one of a positioning plane, a positioning recess, or a mechanical positioning structure.

3. The positioning mechanism according to claim 1, wherein the form of the guide member includes at least one of a height of the guide member relative to the landing area, an area of a projection of the guide member in the landing area, a length of the projection, a width of the projection, a shape of the projection, an angle of the guide member relative to the landing area, a position of the guide member relative to the landing area, or a volume of the guide member.

4. The positioning mechanism according to claim 1, wherein a connection between the guide member and the base includes at least one of the guide member being rotatably connected to the base, the guide member being slidably connected to the base, the guide member being telescopically connected to the base, or the guide member being configured to move from an inside of the base to an outside of the base.

5. The positioning mechanism according to claim 1, wherein movement and transformation of the guide member relative to the base includes at least one of rotation of the guide member relative to the base, translation of the guide member relative to the landing area, turning of the guide member relative to the landing area, lifting of the guide member relative to the landing area, telescoping of the guide member, or change in volume of the guide member.

6. The positioning mechanism according to claim 1, wherein the positioning portion includes a two-dimensional positioning portion for positioning two dimensions in a plane or a three-dimensional positioning space for positioning three dimensions in a space.

7. The positioning mechanism according to claim 1, wherein the landing area further includes an operating region adjoining the positioning portion, the operating region including an operating flap door configured for the operating device to extend out of the base.

8. The positioning mechanism according to claim 1, wherein the guide surface is configured to adjoin the positioning portion when the guide member is in the operating state.

9. The positioning mechanism according to claim 1, wherein the guide surface includes at least one of a V-shaped convex surface, a V-shaped concave surface, an arc convex surface, an arc concave surface, a spherical convex surface, or a spherical concave surface.

10. An unmanned aerial vehicle (UAV) dock comprising:
a positioning mechanism including:
  a base including a landing area, the landing area including a positioning portion; and
  a guide member movably arranged at the landing area and configured to guide a UAV, the guide member being configured to be in a non-operating state or an operating state relative to the base, and a form of the guide member in the non-operating state being different from the form of the guide member in the operating state, and the guide member including a guide surface; and an operating device configured to perform an operation on the UAV, the operating device including a mechanical arm configured to, after the UAV moves to the positioning portion through the guide surface of the guide member, push the UAV to a desired position, and the operating device being configured to operate on the UAV when the UAV is positioned at the positioning portion.

11. The UAV dock according to claim 10, wherein the positioning portion includes at least one of a positioning plane, a positioning recess, or a mechanical positioning structure.

12. The UAV dock according to claim 10, wherein the form of the guide member includes at least one of a height of the guide member relative to the landing area, an area of a projection of the guide member in the landing area, a length of the projection, a width of the projection, a shape of the projection, an angle of the guide member relative to the landing area, a position of the guide member relative to the landing area, or a volume of the guide member.

13. The UAV dock according to claim 10, wherein a connection between the guide member and the base includes at least one of the guide member being rotatably connected to the base, the guide member being slidably connected to the base, the guide member being telescopically connected to the base, or the guide member being configured to move from an inside of the base to an outside of the base.

14. The UAV dock according to claim 10, wherein movement and transformation of the guide member relative to the base includes at least one of rotation of the guide member relative to the base, translation of the guide member relative to the landing area, turning of the guide member relative to the landing area, lifting of the guide member relative to the landing area, telescoping of the guide member, or change in volume of the guide member.

15. The UAV dock according to claim 10, wherein the positioning portion includes a two-dimensional positioning portion for positioning two dimensions in a plane or a three-dimensional positioning space for positioning three dimensions in a space.

16. The UAV dock according to claim 10, wherein:
the operating device is accommodated in the base when not operating; and
the landing area further includes an operating region adjoining the positioning portion, the operating region including an operating flap door configured for the operating device to extend out of the base.

17. The UAV dock according to claim 10, wherein the guide surface configured to adjoin the positioning portion when the guide member is in the operating state.

18. The UAV dock according to claim 10, wherein the guide surface includes at least one of a V-shaped convex surface, a V-shaped concave surface, an arc convex surface, an arc concave surface, a spherical convex surface, or a spherical concave surface.

19. The UAV dock according to claim 10, wherein the operating device further includes a replacing mechanism configured to replace a load of the UAV.

* * * * *